United States Patent
Lenz

(10) Patent No.: US 11,841,240 B2
(45) Date of Patent: Dec. 12, 2023

(54) SYSTEM AND METHOD FOR THE DYNAMIC AND ROBUST UPDATING OF A DIGITAL MAP

(71) Applicant: Bayerische Motoren Werke Aktiengesellschaft, Munich (DE)

(72) Inventor: Dennis Lenz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 17/596,917

(22) PCT Filed: Apr. 17, 2020

(86) PCT No.: PCT/EP2020/060853
§ 371 (c)(1),
(2) Date: Dec. 21, 2021

(87) PCT Pub. No.: WO2021/018423
PCT Pub. Date: Feb. 4, 2021

(65) Prior Publication Data
US 2022/0316914 A1    Oct. 6, 2022

(30) Foreign Application Priority Data
Jul. 31, 2019   (DE) .................. 10 2019 120 705

(51) Int. Cl.
*H04W 24/10*    (2009.01)
*G01C 21/00*    (2006.01)
(Continued)

(52) U.S. Cl.
CPC ..... *G01C 21/3841* (2020.08); *G01C 21/3896* (2020.08); *G05D 1/0274* (2013.01);
(Continued)

(58) Field of Classification Search
CPC ............ G01C 21/3841; G01C 21/3896; G05D 1/0274; G05D 1/0291; G05D 2201/0213; H04W 4/021; H04W 24/10; H04W 64/003
See application file for complete search history.

(56) References Cited

U.S. PATENT DOCUMENTS

2015/0312774 A1   10/2015   Lau
2018/0224284 A1    8/2018   Danford

OTHER PUBLICATIONS

International Search Report (PCT/ISA/210) issued in PCT Application No. PCT/EP2020/060853 dated Jun. 23, 2020 with English translation (five (5) pages).
(Continued)

*Primary Examiner* — Mathew Franklin Gordon
(74) *Attorney, Agent, or Firm* — Crowell & Moring LLP

(57) ABSTRACT

A system and a method for the dynamic and robust updating of a digital map for self-driving vehicles are provided. The system includes a server that is configured to determine a non-up-to-date geographical region of the digital map. The system also includes a vehicle fleet having a plurality of self-driving vehicles. The server is configured to determine the geographical position of the vehicles, to select a suitable vehicle from the vehicle fleet, and to instruct the selected vehicle to move to the non-up-to-date region of the digital map. The vehicle is configured to capture, in the non-up-to-date geographical region, data that is suitable for updating the non-up-to-date geographical region of the digital map.

8 Claims, 2 Drawing Sheets

(51) Int. Cl.
*G05D 1/02* (2020.01)
*H04W 4/021* (2018.01)
*H04W 64/00* (2009.01)

(52) U.S. Cl.
CPC .......... *G05D 1/0291* (2013.01); *H04W 4/021* (2013.01); *H04W 24/10* (2013.01); *H04W 64/003* (2013.01); *G05D 2201/0213* (2013.01)

(56) References Cited

OTHER PUBLICATIONS

German-language Written Opinion (PCT/ISA/237) issued in PCT Application No. PCT/EP2020/060853 dated Jun. 23, 2020 (six (6) pages).

German-language Office Action issued in German Application No. 10 2019 120 705.3 dated Mar. 24, 2020 (four (4) pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for on-Road Motor Vehicles", Surface Vehicle Recommended Practice, SAE (Society of Automotive Engineering) International, J3016TM, Sep. 2016, pp. 1-30 (30 pages).

SYSTEM AND METHOD FOR THE DYNAMIC AND ROBUST UPDATING OF A DIGITAL MAP

BACKGROUND AND SUMMARY OF THE INVENTION

The present invention relates to a system and a method for the dynamic and robust updating of a digital map for automated driving vehicles.

Automated or autonomously driving vehicles comprise a plurality of sensors that play a part in the provision of driver assistance systems, for example, in order to intervene in the drive, control and/or signaling devices of the vehicle in an automated manner. The sensors can comprise for example video cameras, position determining sensors, lidar sensors, radar sensors, etc. The measurement variables or data captured by the sensors are processed and utilized for the use of the driver assistance systems. Automated driving vehicles link a plurality of the aforementioned sensors and further sensors in combination with highly precise digital map data (HD maps) and highly precise position data in order to identify where the vehicles are currently situated, what routes there are around them and how they have to react to various traffic scenarios. Highly precise digital maps or HD maps are digital maps which have a very high degree of precision—for example with cm accuracy—and were developed especially for automated driving.

Despite the availability of the highly precise measurement variables or map data mentioned above, in the case of automated driving vehicles it can happen that the vehicle is confronted with a situation in the overall environment from which the vehicle cannot derive an unambiguous action or reaction. As a solution to such problems it is known from the prior art to teleoperate or remotely control vehicles with only low latency. Teleoperation means that a human operator takes over control of the vehicle in order to analyze the unknown complexity and to operate the vehicle with the aid of the live (measurement) data of the abovementioned vehicle sensors, which are communicated from the vehicle to a teleoperator via a server or via a back end. The live (measurement) data may already have been suitably processed in the vehicle prior to data transmission in order to reduce the amount of data to be transmitted. To that end, the teleoperator has to be connected to the vehicle by way of a communication connection via the mobile radio network. In order that the possibly processed live (measurement) data of the abovementioned vehicle sensors can be communicated to the teleoperator, the mobile radio network has to have a sufficient data transmission capacity in the uplink, i.e. in the data flow direction from the vehicle to the mobile radio network. In order that the teleoperator can communicate the control signals for teleoperation to the vehicle, the mobile radio network has to have a sufficient data transmission capacity in the downlink, i.e. in the data flow direction from the mobile radio network to the vehicle. In many geographical areas the network coverage of the mobile radio network is heterogeneous (arbitrary combination of 2G, 3G, 4G/LTE and 5G access technologies) and still has bottlenecks. Furthermore, bottlenecks can result from overloading of the mobile radio network (e.g. high mobile radio utilization for sports events). In order to guarantee that an automated driving vehicle can be teleoperated at any point in time or in any situation, it is necessary to ensure that an automated vehicle travels only on routes along which a sufficient mobile radio network coverage is present.

The object of the invention is to provide a solution which enables dynamic and robust updating of a digital map for automated driving vehicles in order to derive therefrom a mobile radio network coverage that is sufficient for teleoperation.

This object is achieved according to the claimed invention.

The object mentioned above is achieved by way of a system for the dynamic and robust updating of a digital map for automated driving vehicles, comprising:
  a server configured to determine a non-up-to-date geographical region of the digital map; and
  a vehicle fleet comprising a plurality of automated driving vehicles,
  wherein the server is configured
    to determine the geographical positions of the vehicles; and
    to select a suitable vehicle of the vehicle fleet; and
    to instruct the selected vehicle to move to the non-up-to-date geographical region of the digital map; and
    to capture, at the non-up-to-date geographical region, data suitable for updating the non-up-to-date geographical region of the digital map.

The system comprises a vehicle fleet comprising a plurality of automated driving vehicles. In the context of this document, an automated driving vehicle (hereinafter also: vehicle) comprises mobile transportation that serves to transport persons (passenger traffic), goods (freight traffic) or tools (machines or implements). In particular, the term vehicle encompasses motor vehicles and motor vehicles which can be driven electrically at least in part (electric automobile, hybrid vehicles). In the context of this document, the term "automated driving vehicle" or "automated driving" can be understood to mean driving with automated longitudinal or lateral control or autonomous driving with automated longitudinal and lateral control. Automated driving can involve for example driving for a relatively long time on the interstate or driving for a limited time in the context of parking or maneuvering. The term "automated driving" encompasses automated driving with an arbitrary degree of automation. Exemplary degrees of automation are assisted, partly automated, highly automated or fully automated driving. These degrees of automation were defined by the German Federal Highway Research Institute (BASt) (see BASt publication "Research compact", issue November 2012). In the case of assisted driving, the driver permanently carries out the longitudinal or lateral control, while the system performs the respective other function within certain limits. In the case of partly automated driving, the system performs the longitudinal and lateral control for a certain period of time and/or in specific situations, wherein the driver must permanently monitor the system as in the case of assisted driving. In the case of highly automated driving, the system performs the longitudinal and lateral control for a certain period of time, without the driver having to permanently monitor the system. However, the driver must be able to take over control of the vehicle within a certain time. In the case of fully automated driving, the system can automatically manage driving in all situations for a specific application; a driver is no longer required for this application. The four degrees of automation mentioned above correspond to SAE levels 1 to 4 of the SAE J3016 standard (SAE—Society of Automotive Engineering). Furthermore, SAE J3016 also provides SAE level 5 as the highest degree of automation, which is not contained in the definition by the BASt. SAE level 5 corresponds to driverless driving, wherein the system can automatically manage all situations like a human driver during the entire journey.

Each vehicle can comprise a communication module for establishing a communication connection to other communication subscribers, e.g. other vehicles, the server, mobile terminals, etc. The communication connection can be used for data transmission. The communication module can comprise a subscriber identity module or a SIM card (not shown), which serves to establish a communication connection via a mobile radio system or the mobile radio network. In this case, the subscriber identity module uniquely identifies the communication module in the mobile radio network. The communication connection can be a data connection (e.g. packet switching) and/or a wired communication connection (e.g. circuit switching). A wireless communication connection by way of further conventional and future technologies, e.g. local area networks (LANs) such as e.g. wireless LANs etc. can also be established via the communication module with other communication subscribers.

Each vehicle comprises a suitable position determining sensor for determining highly precise position data of a geographical position using a navigation satellite system. The navigation satellite system can be any conventional and future global navigation satellite system (GNSS) for position determination and navigation by reception of signals from navigation satellites and/or pseudolites. This can involve for example the Global Positioning System (GPS), GLObal NAvigation Satellite System (GLONASS), Galileo positioning system, and/or BeiDou Navigation Satellite System. The highly precise position data can be communicated from each vehicle to a server—as explained in greater detail further below—at regular intervals, e.g. every 0.5, 1 or 2 seconds. Furthermore or as an alternative thereto, the position data can be communicated to the server (see below) in the case of specific events, e.g. engine start, engine stop, etc. of the vehicle.

Each vehicle comprises a plurality of sensors that continuously capture technical measurement variables or data or driving parameters required for the provision of driver assistance systems in order to intervene in the drive, control and/or signaling devices of the vehicle in an automated manner. These sensors comprise video cameras, position determining sensors, lidar sensors, radar sensors and all sensors required for automated driving.

Each vehicle additionally comprises at least one computing unit configured to suitably process the technical measurement variables captured. Each vehicle additionally comprises at least one control unit configured to control the vehicle in an automated manner on the basis of the processed measurement variables.

The vehicles can be part of a vehicle fleet that offers automated driving services (e.g. automated taxis). The vehicles can communicate routes booked by passengers or current journey routes of an automated journey to a server—as explained in greater detail further below.

The system additionally comprises a server or probing task generator. The server can be a backend server and/or part of cloud computing or an IT infrastructure that provides storage space, computing power and/or application software as a service via the Internet.

The server is configured to determine a non-up-to-date geographical region or a non-up-to-date geofence region of a digital map. In particular, the server can determine that the non-up-to-date geographical region requires updating in order to ensure or to determine a mobile radio network capacity required for the teleoperation of automated vehicles. After determining the non-up-to-date geographical region of the digital map, the server is configured to determine the geographical positions of the vehicles of the vehicle fleet. This can be done—as mentioned further above—by communicating the geographical positions from the vehicles to the server. Furthermore or as an alternative thereto, the server can determine journey routes booked by the vehicles or journeys of the vehicles currently being traveled.

The server is configured to select a suitable vehicle from the vehicle fleet. This can be for example:
  a vehicle that is geographically the closest to the determined non-up-to-date geographical region of the digital map; and/or
  a vehicle with a planned route or route along or close to the determined non-up-to-date geographical region (e.g. booked route of an automated taxi, planned route of a user of an automated vehicle, etc.).

In other words, the server can determine a vehicle which, at the given point in time, is situated geographically close to the non-up-to-date geographical region of the digital map and is not currently being moved. Furthermore or as an alternative thereto, the server can determine a vehicle with a planned route along or close to the determined non-up-to-date geographical region. If a vehicle thus e.g. has a booking and is traveling to its destination, the server checks whether the route leads through or passes close to the non-up-to-date geographical region or area that is intended to be measured. A planned or booked route can be adapted by the server in such a way that a small "detour" leads to the non-up-to-date geographical region or moves to the non-up-to-date geographical region following the planned or booked route. The vehicle is then for example already instructed or preconditioned and carries out the probing task (see below) upon reaching the non-up-to-date geographical region.

The server is configured to instruct the selected vehicle to move to the non-up-to-date geographical region of the digital map. This can be done for example by the communication of suitable control signals to the vehicle.

It is thus advantageously possible to carry out active data captures or measurements with reference to a non-up-to-date geographical region of the digital map at a desired point in time, whereby highly up-to-date digital map material is determined.

The selected vehicle is configured to capture, at the non-up-to-date geographical region, data suitable for updating the non-up-to-date geographical region of the digital map.

Preferably, the digital map comprises a mobile radio network coverage map, wherein determining the non-up-to-date geographical region comprises determining a non-up-to-date region of the mobile radio network coverage map.

By way of example, the server can determine that the mobile radio network coverage map is out of date in a geographical region or data regarding the mobile radio network coverage map are not present for a sufficient number of times of the day and night.

Preferably, capturing the data in the non-up-to-date geographical region comprises:
  carrying out a data rate measuring method in the uplink; and/or
  carrying out a data rate measuring method in the downlink; and/or
  carrying out a latency measurement; and/or
  measuring relevant network parameters of the mobile radio network at the measurement time.

The selected vehicle can carry out a data rate measuring method for determining the available data rate at the respective measurement time. The data rate measuring method can be for example a probe rate model (PRM) method, probe gap model (PGM) method, or some other conventional or future method for data rate measurement. In this case, in the uplink, data packets of different amounts of data can be communicated from the vehicle to the server via the mobile radio network, this then resulting in the bandwidth of the mobile radio network at the current measurement time in the uplink. In the downlink, data packets can be communicated from the server to the vehicle, this resulting in the bandwidth of the mobile radio network at the current measurement time in the downlink. The latency measurement can be carried out for example during the transmission of the data packets in the uplink and in the downlink.

Furthermore or as an alternative thereto, mobile network parameters or mobile radio network parameters can be measured at the measurement time. Mobile network parameters comprise e.g. RSRP (Reference Signal Received Power for determining the reception quality of the mobile radio network at the respective measurement time), RSSI (Received Signal Strength Indicator for determining the received broadband power in the transmission channel comprising the thermal noise and noise of the receiving device), RSRQ (Reference Signal Received Quality for determining the reception quality in the mobile radio network), SNR (Signal-to-Noise Ratio for determining the ratio of the average power of the useful signal in the mobile radio network to the average noise power of the interference signal), etc.

Advantageously, it is thus possible to update the mobile radio network coverage map in the geographical region of the measurement by way of live updates of the measurements or data captures carried out by the vehicle. The server can determine therefrom whether a bandwidth required for the teleoperation of automated vehicles is available in the mobile radio network.

The vehicles of the vehicle fleet can be equipped—if necessary—with suitable equipment for measuring the abovementioned measurements.

In the context of this document, one or more of the abovementioned procedures for capturing the data in the non-up-to-date geographical region are also brought together under the designation probing task or probing. In the context of this document, the server is thus also referred to as a "probing task generator".

Preferably, determining the non-up-to-date geographical region of the digital map is effected with the aid of a suitable algorithm.

By way of example, by way of a suitable algorithm (e.g. a rule-based algorithm), the server can continuously determine in what geographical region and/or at what time of day or for what events (e.g. soccer match in the stadium, concert, etc.) in the geographical region an update of the digital mobile radio network coverage map is required. The algorithm can additionally determine what data have to be gathered or measured by the vehicle at the geographical region.

In accordance with a second aspect, the underlying object is achieved by way of a method for the dynamic and robust updating of a digital map for automated driving vehicles, comprising:

determining, by a server, a non-up-to-date geographical region of the digital map;

determining, by the server, the geographical position of a plurality of automated driving vehicles of a vehicle fleet;

selecting, by the server, a suitable vehicle of the vehicle fleet;

instructing, by the server, the selected vehicle to move to the non-up-to-date geographical region of the digital map; and capturing, by the selected vehicle, data suitable for updating the non-up-to-date geographical region of the digital map.

Preferably, the digital map comprises a mobile radio network coverage map, wherein determining the non-up-to-date geographical region comprises determining a non-up-to-date region of the mobile radio network coverage map.

Preferably, capturing the data in the non-up-to-date geographical region comprises:

carrying out a data rate measuring method in the uplink; and/or carrying out a data rate measuring method in the downlink; and/or carrying out a latency measurement; and/or measuring relevant network parameters of the mobile radio network at the measurement time.

Preferably, determining the non-up-to-date geographical region of the digital map is effected with the aid of a suitable algorithm.

These and other objects, features and advantages of the present invention will be clarified from study of the following detailed description of preferred embodiments and the accompanying figures. It is evident that—although embodiments are described separately—individual features therefrom can be combined to form additional embodiments.

DETAILED DESCRIPTION OF THE DRAWINGS

Figure 1:
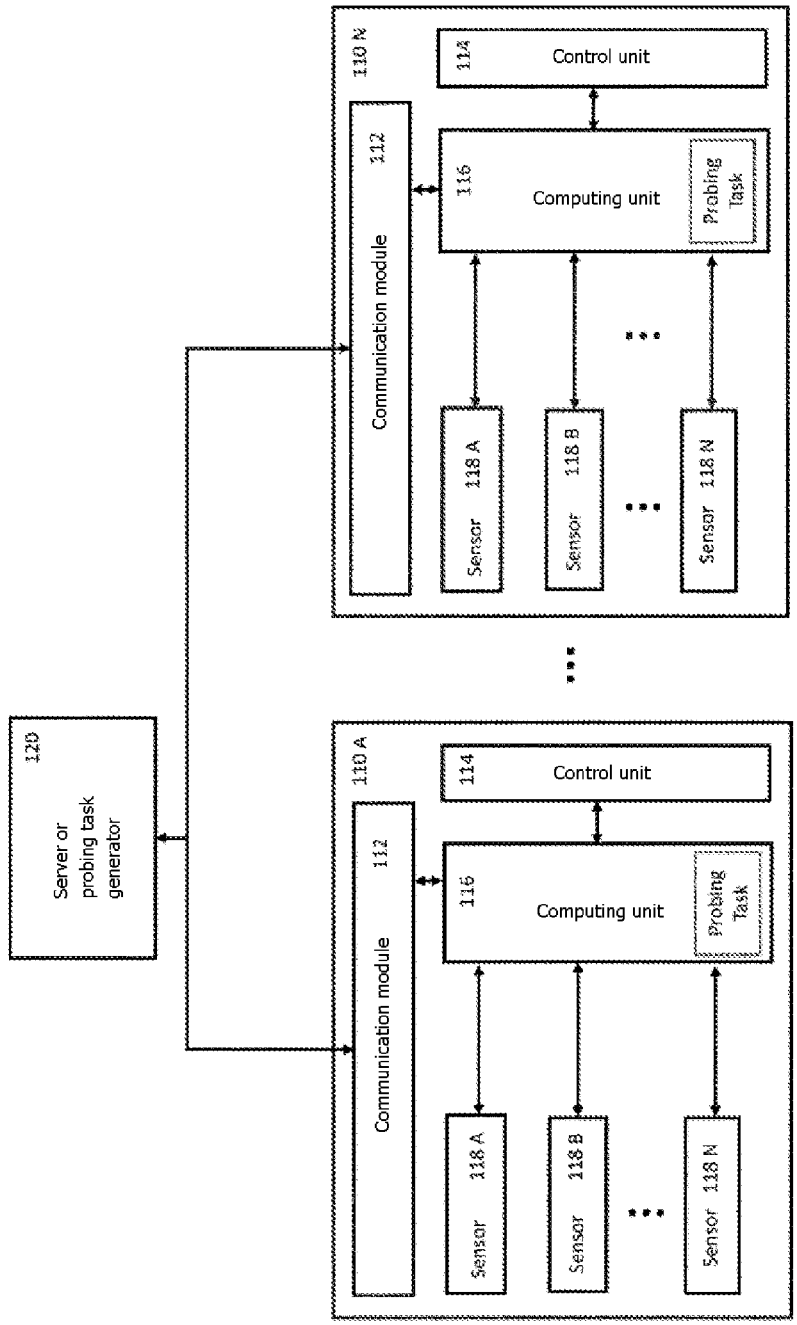
FIG. 1 shows a schematic system for the dynamic and robust updating of a digital map for automated driving vehicles.

FIG. 1 schematically shows an exemplary system 100 for the dynamic and robust updating of a digital map for automated driving vehicles 110 A . . . 110 N.

The system 100 comprises a vehicle fleet comprising a plurality of automated driving vehicles 110 A . . . 110 N.

Each vehicle 110 A . . . 110 N can comprise a communication module 112 for establishing a communication connection to other communication subscribers, e.g. other vehicles 110 A . . . 110 N, the server 120, mobile terminals (not shown), etc. The communication connection can be used for data transmission.

Each vehicle 110 A . . . 110 N comprises a suitable position determining sensor 118 A . . . 110 N for determining highly precise position data of a geographical position k using a navigation satellite system. The navigation satellite system can be any conventional and future global navigation satellite system (GNSS) for position determination and navigation by reception of the signals from navigation satellites and/or pseudolites. The highly precise position data can be communicated from each vehicle 110 A . . . 110 N to a server 120—as explained in greater detail further below—at regular intervals, e.g. every 0.5, 1 or 2 seconds.

Furthermore or as an alternative thereto, the position data can be communicated to the server 120 (see below) in the case of specific events, e.g. engine start, engine stop, etc. of the vehicle 110 A . . . 110 N.

Each vehicle 110 A . . . 110 N comprises a plurality of sensors 118 A . . . 118 N that continuously capture technical measurement variables or data or driving parameters that are required for the provision of driver assistance systems in order to intervene in the drive, control and/or signaling devices of the vehicle 110 A . . . 110 N in an automated manner. The sensors 118 A . . . 118 N comprise video cameras, position determining sensors, lidar sensors, radar sensors and all sensors 118 A . . . 118 N required for automated driving.

Each vehicle 110 A . . . 110 N additionally comprises at least one computing unit 116 configured to suitably process the captured technical measurement variables. Each vehicle 110 A . . . 110 N additionally comprises at least one control unit 114 configured to control the vehicle 110 A . . . 110 N in an automated manner on the basis of the processed measurement variables.

The vehicles 110 A . . . 110 N can be part of a vehicle fleet that offers automated driving services (e.g. automated taxis). The vehicles 110 A . . . 110 N can communicate routes booked by passengers or current journey routes of an automated journey to a server 120—as explained in greater detail further below.

The system 100 additionally comprises a server 120. The server 120 can be a backend server and/or part of cloud computing or an IT infrastructure that provides storage space, computing power and/or application software as a service via the Internet.

The server 120 is configured to determine a non-up-to-date geographical region of a digital map. In particular, the server 120 can determine that the non-up-to-date geographical region requires updating in order to ensure or to determine a mobile radio network capacity required for the teleoperation of automated vehicles 110 A . . . 110 N.

Determining 210 the non-up-to-date geographical region of the digital map by the server 120 can be effected with the aid of a suitable algorithm. By way of example, by way of a suitable algorithm (e.g. a rule-based algorithm), the server 120 can determine in what geographical region and optionally at what times in a geographical region an update of the digital mobile radio network coverage map is required. It is additionally possible to determine what data have to be gathered or measured by the selected vehicle 110 A . . . 110 N at the non-up-to-date geographical region.

The digital map can comprise a mobile radio network coverage map, wherein determining 210 the non-up-to-date geographical region by the server 120 comprises determining a non-up-to-date region of the mobile radio network coverage map. By way of example, the server 120 can determine that the mobile radio network coverage map is out of date in a geographical region or data regarding the mobile radio network coverage map are not present for a sufficient number of times of the day and/or night.

After determining 210 the non-up-to-date geographical region of the digital map, the server 120 is configured to determine the geographical positions of the vehicles 110 A . . . 110 N of the vehicle fleet. This can be done, as mentioned further above, by communicating the geographical positions from the vehicles 110 A . . . 110 N to the server 120. Furthermore or as an alternative thereto, the server 120 can determine journey routes booked by the vehicles 110 A . . . 110 N or journeys of the vehicles 110 A . . . 110 N currently being traveled.

The server 120 is configured to select a suitable vehicle from the vehicle fleet. This can be for example:
  a vehicle 110 A . . . 110 N that is geographically the closest to the determined non-up-to-date geographical region of the digital map;
  a vehicle 110 A . . . 110 N with a planned route or route along or close to the determined non-up-to-date geographical region (e.g. booked route of an automated taxi or vehicle 110 A . . . 110 N, planned route of a user of an automated vehicle 110 A . . . 110 N, etc.).

The server 120 is configured to instruct the selected vehicle 110 A . . . 110 N to move to the non-up-to-date geographical region of the digital map. This can be done for example by the communication of suitable control signals to the selected vehicle 110 A . . . 110 N.

In other words, the server 120 can determine a vehicle 110 which, at the given point in time, is situated geographically close to the non-up-to-date geographical region of the digital map and is not currently being moved. Furthermore or as an alternative thereto, the server 120 can determine a vehicle 110 with a planned route along or close to the determined non-up-to-date geographical region. If a vehicle 110 thus e.g. has a booking and is traveling to its destination, the server 120 checks whether the route leads through or passes close to the non-up-to-date geographical region or area that is intended to be measured. A planned or booked route can be adapted by the server 120 in such a way that a small "detour" leads to the non-up-to-date geographical region or moves to the non-up-to-date geographical region following the planned or booked route. The vehicle 110 is then for example already instructed or preconditioned and carries out the probing task (see above) upon reaching the non-up-to-date geographical region.

Advantageously, it is thus possible to carry out active data captures or measurements with reference to a non-up-to-date geographical region of the digital map at a desired point in time, whereby highly up-to-date digital map material is obtained. A selected vehicle 110 A . . . 110 N whose planned route or current route is in the vicinity of the non-up-to-date geographical region of the digital map can acquire from the server a route update that leads along the non-up-to-date geographical region, such that the selected vehicle 110 A . . . 110 N there can capture the required data for updating the digital map.

The selected vehicle 110 A . . . 110 N is configured to capture, at the non-up-to-date geographical region, data suitable for updating the non-up-to-date geographical region of the digital map.

By way of example, capturing the data in the non-up-to-date geographical region comprises:
  carrying out a data rate measuring method in the uplink; and/or
  carrying out a data rate measuring method in the downlink; and/or
  carrying out a latency measurement;
  measuring relevant network parameters of the mobile radio network at the measurement time.

The selected vehicle can carry out a data rate measuring method for determining the available data rate at the respective measurement time. The data rate measuring method can be for example a probe rate model (PRM) method, probe gap model (PGM) method, or some other conventional or future method for data rate measurement. In this case, in the uplink, data packets of different amounts of data can be communicated from the vehicle to the server 120 via the mobile radio network, this then resulting in the bandwidth of the mobile radio network at the current measurement time in the uplink.

In the downlink, data packets can be communicated from the server 120 to the vehicle 110 A . . . 110 N, this resulting in the bandwidth of the mobile radio network at the current measurement time in the downlink. The latency measurement can be carried out for example during the transmission of the data packets in the uplink and in the downlink.

Furthermore or as an alternative thereto, mobile network parameters or mobile radio network parameters can be measured at the measurement time. Mobile network parameters comprise e.g. RSRP (Reference Signal Received Power for determining the reception quality of the mobile radio network at the respective measurement time), RSSI (Received Signal Strength Indicator for determining the received broadband power in the transmission channel comprising the thermal noise and noise of the receiving device), RSRQ (Reference Signal Received Quality for determining the reception quality in the mobile radio network), SNR (Signal-to-Noise Ratio for determining the ratio of the average power of the useful signal in the mobile radio network to the average noise power of the interference signal), etc.

Advantageously, it is thus possible to update the mobile radio network coverage map in the geographical region of the measurement by way of live updates of the measurements or data captures carried out by the vehicle 110 A . . . 110 N. The server 120 can determine therefrom whether a bandwidth required for the teleoperation of automated vehicles 110 A . . . 110 N is available in the mobile radio network.

The vehicles 110 A . . . 110 N of the vehicle fleet can be equipped—if necessary—with suitable equipment for determining 150 suitable data or for carrying out the measurements with reference to the mobile radio network coverage.

Figure 2:
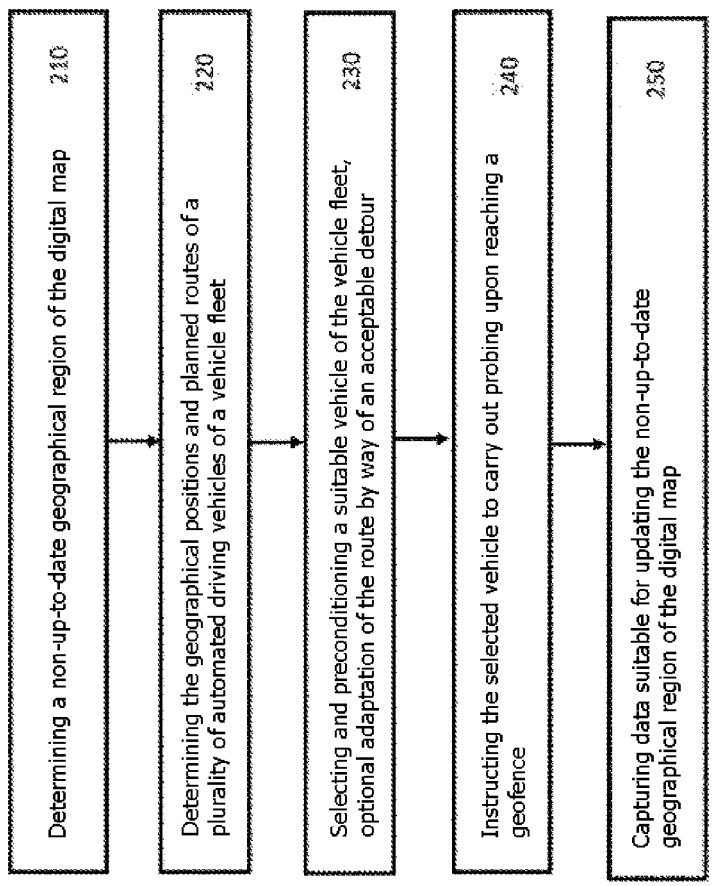
FIG. 2 shows an exemplary method for the dynamic and robust updating of a digital map for automated driving vehicles.

FIG. 2 shows a method 200 for the dynamic and robust updating of a digital map for automated driving vehicles 110 A . . . 110 N, which method can be performed by a system 100 as described with reference to FIG. 1.

The method 200 comprises:
  determining 210, by a server 120, a non-up-to-date geographical region of the digital map;
  determining 220, by the server 120, the geographical position of a plurality of automated driving vehicles 110 A . . . 110 N of a vehicle fleet;
  selecting 230, by the server 120, a suitable vehicle 110 A . . . 110 N of the vehicle fleet;
  instructing 240, by the server 120, the selected vehicle 110 A . . . 110 N to move to the non-up-to-date geographical region of the digital map; and
  capturing 250, by the selected vehicle 110 A . . . 110 N, data suitable for updating 210 the non-up-to-date geographical region of the digital map.

The digital map can comprise a mobile radio network coverage map, wherein determining 210 the non-up-to-date geographical region can comprise determining a non-up-to-date region of the mobile radio network coverage map.

Capturing 210 the data in the non-up-to-date geographical region can comprise:
  carrying out a data rate measuring method in the uplink; and/or
  carrying out a data rate measuring method in the downlink; and/or
  carrying out a latency measurement; and/or
  measuring relevant network parameters of the mobile radio network at the measurement time.

Determining 210 the non-up-to-date geographical region of the digital map can be effected with the aid of a suitable algorithm.

What is claimed is:

1. A system for updating a digital map for automated driving vehicles, the system comprising:
  a server configured to determine a non-up-to-date geographical region of the digital map; and
  a vehicle fleet comprising a plurality of automated driving vehicles,
  wherein the server is configured to:
    determine geographical positions of the vehicles;
    select a suitable vehicle of the vehicle fleet;
    instruct the selected vehicle to move to the non-up-to-date geographical region of the digital map; and
    capture, at the non-up-to-date geographical region, data suitable for updating the non-up-to-date geographical region of the digital map.

2. The system according to claim 1,
  wherein the digital map comprises a mobile radio network coverage map; and
  wherein the server is configured to determine the non-up-to-date geographical region of the digital map by determining a non-up-to-date region of a mobile radio network coverage map.

3. The system according to claim 1, wherein the server is configured to capture the data in the non-up-to-date geographical region by at least one of:
  carrying out a data rate measuring method in an uplink;
  carrying out a data rate measuring method in a downlink;
  carrying out a latency measurement; or
  measuring relevant network parameters of a mobile radio network at a measurement time.

4. The system according to claim 1, wherein the server is configured to determine the non-up-to-date geographical region of the digital map with aid of a suitable algorithm.

5. A method for updating a digital map for automated driving vehicles, the method comprising:
  determining, by a server, a non-up-to-date geographical region of the digital map;
  determining, by the server, a geographical position of a plurality of automated driving vehicles of a vehicle fleet;
  selecting, by the server, a suitable vehicle of the vehicle fleet;
  instructing, by the server, the selected vehicle to move to the non-up-to-date geographical region of the digital map; and
  capturing, by the selected vehicle, data suitable for updating the non-up-to-date geographical region of the digital map.

6. The method according to claim 5,
  wherein the digital map comprises a mobile radio network coverage map; and
  wherein determining the non-up-to-date geographical region comprises determining a non-up-to-date region of the mobile radio network coverage map.

7. The method according to claim 5, wherein capturing the data in the non-up-to-date geographical region comprises at least one of:
  carrying out a data rate measuring method in an uplink;
  carrying out a data rate measuring method in a downlink;
  carrying out a latency measurement; or
  measuring relevant network parameters of a mobile radio network at a measurement time.

8. The method according to claim 5, wherein determining the non-up-to-date geographical region of the digital map is effected with aid of a suitable algorithm.

* * * * *